US006387577B2

(12) United States Patent
Simons

(10) Patent No.: US 6,387,577 B2
(45) Date of Patent: May 14, 2002

(54) FILM WITH RANDOM COLOR FILTER ARRAY

(75) Inventor: Michael J. Simons, Middlesex (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/808,873

(22) Filed: Mar. 15, 2001

(30) Foreign Application Priority Data

Mar. 23, 2000 (GB) ............................................ 0006945

(51) Int. Cl.[7] .......................... G03C 1/825; G02B 5/20

(52) U.S. Cl. .......................................... 430/7; 430/511

(58) Field of Search ..................................... 430/7, 511

(56) References Cited

U.S. PATENT DOCUMENTS

| | | | | |
|---|---|---|---|---|
| 822,532 A | | 6/1906 | Lumiere et al. | |
| 3,728,116 A | * | 4/1973 | Waxman et al. | 430/222 |
| 4,971,869 A | | 11/1990 | Plummer | |
| 5,804,359 A | | 9/1998 | Simons | |

FOREIGN PATENT DOCUMENTS

| | | |
|---|---|---|
| EP | 0 935 168 | 8/1999 |

* cited by examiner

*Primary Examiner*—John A. McPherson
(74) *Attorney, Agent, or Firm*—Frank Pincelli

(57) ABSTRACT

A color film with a light transmitting support has a light sensitive emulsion layer and a random color filter array coated thereon such that the light sensitive emulsion layer is exposed to light which has passed first through the color filter array. The color filter array comprises water immiscible colored filter elements which are fluid at the temperatures used for coating and drying.

8 Claims, 1 Drawing Sheet

FILM WITH RANDOM COLOR FILTER ARRAY

FIELD OF THE INVENTION

This invention relates to color film, and in particular to film with a random color filter array.

BACKGROUND OF THE INVENTION

The great majority of color photographs today are taken using chromogenic color film, in which color-forming couplers, which may be incorporated in the film or present in the processing solution, form cyan, magenta and yellow dyes by reaction with oxidized developing agent which is formed where silver halide is developed in an image wise pattern. Such films require a development process which is carefully controlled in respect of time and temperature, which is usually followed by a silver bleaching and a fixing step, and the whole process typically takes several minutes and needs complex equipment.

Color photography by exposing a black-and-white photographic emulsion through a color filter array which is an integral part of the film or plate on which the photographic emulsion is coated, has long been known to offer certain advantages of simplicity or convenience in color photography. Thus the Autochrome process, disclosed by the Lumiere brothers in 1906 (U.S. Pat. No. 822,532) exposed the emulsion through a randomly disposed layer of red, green and blue-colored potato starch grains, and the emulsion was reversal processed to give a positive image of the scene which appeared colored when viewed by light transmitted through the plate. The process allowed the formation of a colored photograph without the chemical complexity of later photographic methods.

The Dufaycolor process (initially the Dioptichrome plate, L.Dufay, 1909) used a regular array of red, green and blue dyed patches and lines printed on a gelatin layer in conjunction with a reversal-processed black-and-white emulsion system which similarly gave a colored image of the scene when viewed by transmitted light.

Polavision (Edwin Land and the Polaroid Corporation, 1977) was a color movie system employing a rapid and convenient reversal processing method on a black-and-white emulsion system coated above an array of red, green and blue stripes, which gave a colored projected image. It was marketed as a still color transparency system called Polachrome in 1983.

These methods suffered a number of disadvantages. The images were best viewed by passing light through the processed film or plate, and the image quality was not sufficient to allow high quality prints to be prepared from them, due to the coarse nature of the Autochrome and Dufaycolor filter arrays, and the coarse nature of the positive silver image in the Polavision and Polacolor systems. The regular array patterns were complicated and expensive to manufacture. In addition, the films which used regular or repeating filter arrays were susceptible to color aliasing when used to photograph scenes with geometrically repeating features.

U.S. Pat. No. 4,971,869 discloses a film with a regular repeating filter array which claims to be less susceptible to aliasing problems. The film comprises a panchromatic photographic emulsion and a repetitive pattern of a unit of adjacent colored cells wherein at least one of the cells is of a subtractive primary color (e.g. yellow, magenta or cyan) or of a pastel color. Scene information can be extracted from the developed film by opto-electronic scanning methods.

EP 935 168 discloses a light sensitive material comprising a transparent support having thereon a silver halide emulsion layer and a randomly arranged color filter layer comprising colored resin particles. The document also discloses exposing, processing and electro-optically scanning the resultant image in such a film and reconstructing the image by digital image processing.

PROBLEM TO BE SOLVED THE INVENTION

Color photographic films which comprise a color filter array and a single image recording layer or layer pack have the advantage of rapid and convenient photographic processing, as the single image recording layer or layer pack can be processed rapidly without the problem of mismatching different color records if small variations occur in the process. A small change in extent of development for example will affect all color records equally. Exceptionally rapid processing is possible using simple negative black-and-white development, and if suitable developing agents are included in the coating, the photographic response can be remarkably robust or tolerant towards inadvertent variations in processing time or temperature. Developing agents suitable for including in the coating, and a preferred way of incorporating them, are disclosed in U.S. Pat. No. 5,804,359.

It is therefore desired that the color filter array does not impede the transport of processing solutions and processing chemicals through the film, and that it provides a sufficient area of water-permeable material within its structure to enable passage of aqueous solutions through the array as required. This is particularly important if the array is coated further from the film support than the photographic emulsion layer(s), which is a preferred structure for the film.

It is also desirable that the color filter array be manufacturable at comparatively low cost. Known methods of making regular filter arrays, such as those used for Dufaycolor or Polachrome films, are complex and costly, involving several sequential applications of materials to the film. Known methods of making random filter arrays, such as those used for Autochrome film and that described in EP 935 168 also involve complex operations, including separating and grading or sizing the colored particles of starch or resin respectively, dispersing them in a coating medium, coating and drying and then calendaring the coated layer to flatten the particles.

SUMMARY OF THE INVENTION

It is an aim of the invention to provide a color filter array film which avoids the problems mentioned above.

According to the present invention there is provided a color film comprising a support layer, at least one light sensitive emulsion layer and a layer formed of a randomly disposed color filter array, wherein the color filter array layer is coated from an aqueous medium and comprises water immiscible colored filter elements which are fluid at the temperatures used in coating and drying.

Preferably the color filter array layer is coated further from the support than the emulsion layer or layers.

The invention further provides a method of forming a color image of a scene from an imagewise exposed photographic film, the film comprising a support layer, at least one light sensitive emulsion layer and a layer formed of a randomly disposed color filter array, wherein the color filter array layer is coated from an aqueous medium and comprises water immiscible colored filter elements which are fluid at the temperatures used in coating and drying, the method comprising developing the image of the scene formed in the emulsion layer, and processing the scanned image information to give an electronically coded representation of the scene.

ADVANTAGEOUS EFFECT OF THE INVENTION

The film of the invention has the advantage of exceptionally rapid and convenient photographic processing, as it can be processed using simple negative back-and-white development, as opposed to either a reversal process or a chromogenic process. It avoids the disadvantages of aliasing and of high manufacturing cost associated with regular color filter arrays by using a random array which may be prepared simply by coating a layer of suitable colored particles or droplets. The lower image quality formerly associated with random color filter arrays is overcome by means of electronic image processing, which can result in good quality color images, especially in the case of the preferred embodiment having the specified filter element sizes.

Unlike films which employ filter arrays comprising solid particles of resin or starch grains, the film of the invention allows ready access of aqueous processing solutions through the color filter array (CFA) layer. This is desirable because in the case that the CFA is located between the emulsion layers and the support it allows passage of supplementary processing chemicals which may be coated in the film and located between the CFA and the support (for instance, stabilizing, pH modifying or fixing chemicals). In the case that the CFA is located between the emulsion layers and the top coated surface of the film, it allows passage of the processing solutions themselves through into the emulsion layers. Passage of processing solutions through the CFA layer is enabled because of the change of shape of the fluid, water-immiscible colored filter elements which occurs when the CFA layer swells in the processing solution as depicted in FIG. 2.

The color filter array of the invention allows convenient manufacture of films having a preferred film structure in which the CFA is located between the emulsion layers and the top coated surface of the film, that is located further from the support than the emulsion layers. This film structure is preferred because it allows the film to be exposed in the camera with the support towards the back of the camera and the emulsion side toward the lens, which is the orientation for which films and cameras are normally designed. Such a film structure is preferable in the case of Advanced Photographic System films because the magnetic recording layer functions most effectively when coated on the back of the support and has to be in contact with the magnetic heads in the back of the camera. The random filter array preparation methods of the prior art would entail complex operations on top of an already-coated emulsion layer, which would need to be done under safelight conditions and would risk harming the very sensitive coated emulsion layers for instance by causing fog or desensitization. Heat calendaring operations, as used in the method described in EP 935 168 could very probably cause heat and pressure fog in the already-coated emulsion layer(s). Furthermore, the random color filter arrays of the prior art are not expected to allow sufficient permeability to processing solutions, and, because of their more rigid nature, are expected to present problems of adhesion and physical integrity if underlying gelatinous layers were to become soft and swollen, as is required for normal photographic processing.

Reference is made to related commonly owned co-pending applications entitled Method of Making a Random Color Filter Array, U.S. Ser. No. 09/808,844, and Random Color Filter Array, U.S. Ser. No. 09/810,787, now U.S. Pat. No. 6,326,108 both filed concurrently herewith, the entire contents of which are incorporated herein.

BRIEF DESCRIPTION OF THE DRAWINGS

The invention will now be described, by way of example, with reference to the accompanying drawings, in which.

DETAILED DESCRIPTION OF THE INVENTION

Figure 1:
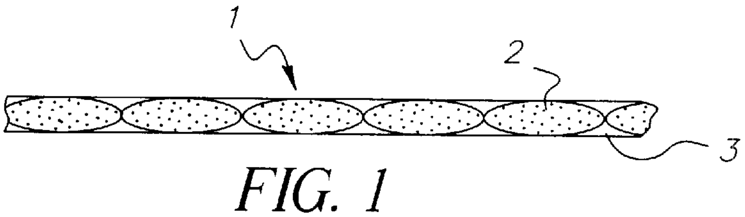
FIG. 1 is a schematic view of the filter layer in a dried state.

FIG. 1 shows the random color filter array layer in its dried state. The filter layer 1 comprises a plurality of water immiscible color filter elements or patches 2. The individual linear dimensions (diameter in the case of a circular element) of each element or patch in the plane of the film may be between 1 and 50 micrometers. In a preferred embodiment of the invention the mean dimension is between 3 and 10 micrometers in diameter.

The colored elements or patches 2 may be formed by a number of processes, including those described in our co-pending application Method of Making a Random Color Filter Array, U.S. Ser. No. 09/808,844, filed concurrently with this application. A convenient method is to form colored oil droplets of a suitable size which can be coated in a layer with a polymeric binding agent such as gelatin. Three or more color channels are generally required. These can be provided by, for instance, two color classes of color element spaced irregularly in the plane of the film with the spaces between them, viewed from a direction normal to the film plane, either colorless (clear or white), or of a third color. Alternatively, three or more color classes of discrete color elements may be provided, and the spaces between them may be colorless (clear or white), or dark or black, or colored The colored elements of the color filter array may comprise various colored fluid or liquid substances, including droplets of water-immiscible organic solvents which may be so-called coupler solvents as used in the photographic industry, in which are incorporated dyes or pigments.

Suitable water-immiscible organic solvents are in general of low volatility, and include for example tricresyl phosphate, di-n-butyl phthalate, diundecyl phthalate, N,N-diethyl lauramide, N,N-di-n-butyl lauramide, triethyl citrate and trihexyl citrate. Other solvents, which may be partially water-soluble, such as ethyl acetate and cyclohexanone, may be used in addition during the preparation of the dispersions, and they may be removed from the final dispersion or coating either by washing or by evaporation.

Suitable dyes may be oil-soluble in nature, and can be chosen for example from the classes of solvent dyes and disperse dyes listed in the Color Index, 3$^{rd}$ Edition, published by The Society of Dyers and Colorists, Bradford, England. Specific examples are listed under their Color Index (CI) names, and include CI Solvent Blue 14, CI Solvent Blue 35, CI Solvent Blue 63, CI Solvent Blue 79, CI Solvent Yellow 174, CI Solvent Orange 1, CI Solvent Red 19, CI Solvent Red 24, CI Disperse Yellow 3, and 4-phenylazodiphenylamine.

Suitable pigments are chosen for their properties of hue, fastness, and dispersibility, and can include CI Pigment Green 7, CI Pigment Green 36, CI Pigment Blue 15:3, CI Pigment Blue 60, CI Pigment Violet 23, CI Pigment Red 122, CI Pigment Red 177, CI Pigment Red 194, CI Pigment Orange 36, CI Pigment Orange 43, CI Pigment Yellow 74, CI Pigment Yellow 93, CI Pigment Yellow 110, and CI Pigment Yellow 139.

When pigment particles are incorporated in the colored elements, they should be of a fine particle size, preferably substantially less than one micrometer. Provided the droplets retain their fluid nature, various substances including polymeric and particulate substances may be incorporated within them, and these may include dispersing agents such as those used in the pigment and paint industries.

Examples of dispersing agents include the Solsperse™ range of dispersants marketed by Avecia Limited, such as Solsperse 5000, Solsperse 17,000, Solsperse 22,000, and Solsperse 24,000. Further Solsperse dispersing agents are numbered 13650, 13940, and 34750. Another suitable dispersing agent is Carbam 111™, marketed by AAA (Applied Analytics and Automation, M. H. Mathews Additive & Messgerate, Bad Nauheim, Germany).

Polymeric additives to modify the rheology or other properties of the fluid droplets include oil soluble polymers such as polyvinyl butyral, styrene polymers and copolymers, vinyl polymers and copolymers, and acrylate polymers and copolymers.

The colored elements of the color filter array are supported in the polymeric binder 3 of the color filter array layer. The binder 3 may be a water-permeable polymeric substance such as gelatin. Coloring agents may be added to the binder 3 so as to color it, and the coloring agents may include dyes which are bound in the layer by chemical or physical means, or finely divided pigment particles which are bound in the polymeric layer.

Pigments used to color the water-permeable polymeric binder can include those listed above. Dyes used to color the water-permeable polymeric binder are water-soluble dyes, and may be anionic dyes such as acid dyes, direct dyes and mordant dyes, for example CI Acid Yellows 40, 42, 65 and 99; CI Acid Orange 63; CI Acid Red 92; CI Acid Violets 7, 9 and 17; CI Acid Blues 7, 92, and 249; CI Direct Yellow 50; CI Direct Red 75; and CI Mordant Red 3. Anionic dyes may be bound in the layer by means of a cationic polymeric mordant, or by interaction with large cationic molecules or with metal salts. Alternatively, cationic dyes may be used, and bound in the layer by means of an anionic polymeric mordant, or by interaction with large anionic molecules including surfactant molecules. Examples of cationic dyes which may be used include CI Basic Yellow 11, CI Basic Red 9, CI Basic Blues 3 and 66, and CI Mordant Blue 14.

Figure 2:
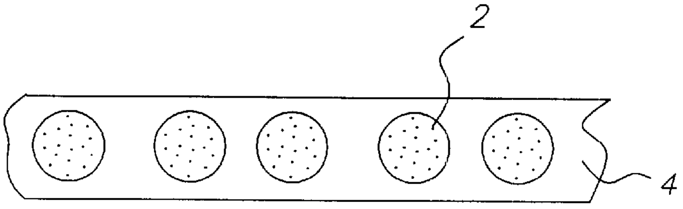
FIG. 2 is a schematic view of the filter layer in a wet, swollen state.

The fluid color filter elements 2 flatten and expand sideways within the plane of the coating on drying to form optically efficient disc-like elements. On wet processing (development and fixing) the color filter elements 2 become spherical when the coating is swollen by the processing solution, thus becoming of smaller diameter in the plane of the coating to allow channels 4 to form between them. This is shown in FIG. 2. These channels 4 allow passage of processing solution through the color filter array layer 1. When the CFA is located between the emulsion layers and the support the channels allow the passage of supplementary processing chemicals which may be coated in the film and located between the CFA and the support (for instance, stabilizing, pH modifying or fixing chemicals). When the CFA is located between the emulsion layers and the top coated surface of the film the channels allow passage of the processing solutions themselves through into the emulsion layers. If a CFA layer is employed which is comprised of closely packed color elements which are not capable of reducing their diameters in the plane of the film, the passage of processing solutions and chemicals will be restricted. Furthermore, in areas of the random array where filter elements are particularly closely packed, the restriction of chemical access in those particular areas will be likely to influence development, causing an undesirable imprint of the array structure on the developed image layer.

Figure 3:
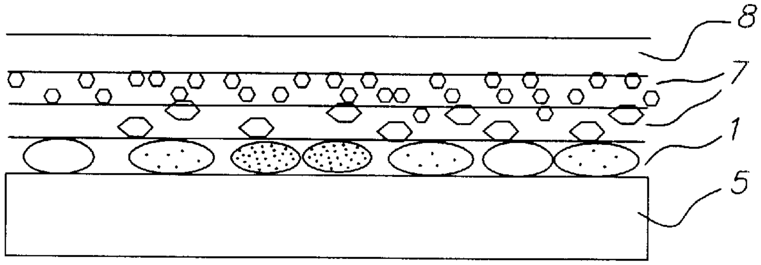
FIG. 3 is a schematic view of a film according to one embodiment of the invention.

Passage of processing solutions and chemicals through the CFA layer is especially important in the preferred film structure in which the CFA is located between the emulsion layers and the top coated surface of the film, that is between the emulsion layers and the processing solutions which are applied to the film, see FIG. 4 described below. This film structure is preferred because it allows the film to be exposed in the camera with the support towards the back of the camera and the emulsion side toward the lens, which is the orientation for which films and cameras are normally designed. Such a film structure is essential in the case of Advanced Photographic System films because the magnetic recording layer functions most effectively when coated on the back of the support and has to be in contact with the magnetic heads in the back of the camera FIG. 3 shows a film according to a first embodiment of the invention. In this embodiment the film is coated with a color filter array 1 nearest to the support 5. Optionally, an underlayer (not shown) may be coated between the support 5 and the color filter array 1, and chemicals which are useful during chemical processing may be coated in the underlayer. An emulsion layer unit 7 is provided above the color filter array 1. The top layer of the film is provided by a supercoat 8 with antihalation means.

The emulsion layer unit 7 may comprise one or more layers. The unit is sensitive to light which has passed through each or all of the different color elements of the array 1. Thus the image information for each color record is recorded in the emulsion layer unit. The emulsions may be of different speeds. Photographic addenda known in the art, such as antifoggants and speed-increasing agents may be present in or adjacent to the emulsion layers 7. Substances such as developing agents, blocked developing agents, color couplers and other materials which take part in the processing step may be in or adjacent to the emulsion layer unit 7. Developing agents suitable for including in the coating, and a preferred way of incorporating them, are disclosed in U.S. Pat. No. 5,804,359.

Figure 4:
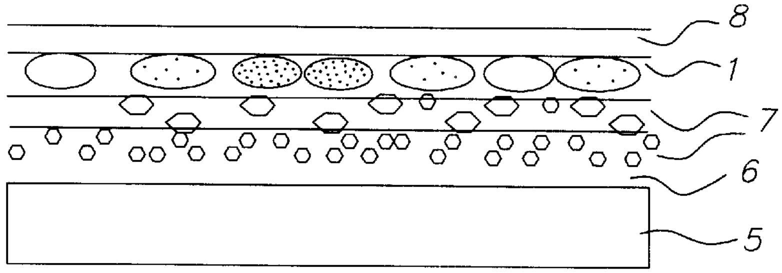
FIG. 4 is a schematic view of a film according to a second embodiment of the invention.

FIG. 4 shows a second, preferred, embodiment of the film in which the color filter array 1 is further from the support 5 than the emulsion layer unit 7. An antihalation layer 6 is provided between the support 5 and the emulsion layer unit 7. Chemicals which are useful during chemical processing may also be coated in this antihalation layer.

It is necessary for the emulsion layers 7 to be exposed by light which has passed through the color filter array 1. Thus with the film structure depicted in FIG. 3, the support 5 will be closer to the camera lens during exposure than the coated layers. With the film structure depicted in FIG. 4, the coated layers will be closer to the camera lens during exposure than the film support 5.

After exposure, the emulsion layers 7 may be developed and fixed by known methods of photographic processing so as to give an image which modulates light passing through each of the spectrally distinguishable types of filter element. Conventional black-and-white development, using developing agents contained in the solution and/or coated in the film, followed by fixing and washing, is a suitable form of photographic processing.

Conventional scanning techniques can be employed, including point-by-point, line-by-line and area scanning, and require no detailed description. A simple technique for scanning is to scan the photographically processed element point-by-point along a series of laterally offset parallel scan paths. The intensity of light received from or passing through the photographic element at a scanning point is noted by a sensor which converts radiation received into an electrical signal. The electrical signal is processed and sent to memory in a digital computer together with locant information required for pixel location within the image.

A convenient form of scanner can consist of a single multicolor image sensor or a single set of color sensors, with a light source placed on the opposite side of the film. Light transmitted through the film can give information on the image pattern in the emulsion layer(s) modulated by the color filter array.

Various methods of image processing may be employed. A relatively simple method is to represent the image data in a color model which has a luminance or lightness component and two chromatic or color components, such as the CIE L*a*b model. The chromatic components are then blurred with a suitable image filter to remove the higher frequency color information which arises largely from the color filter array, and the blurred chromatic information recombined with the original luminance information. The color saturation of the image may be varied by altering the contrast of the chromatic components.

Other methods of image processing may be employed

Another method of image processing which is very suitable for reconstructing images recorded through a random filter array is disclosed in co-pending application GB 0002481.0, entitled Method of Image Processing, here incorporated by reference.

After image processing, the resulting representation of the scene recorded by the method of the invention may be viewed on a screen or printed by suitable means to give a printed photographic image.

EXAMPLE 1

This Example describes the preparation and use of a film according to the invention.

Preparation of a Random Color Filter Array

The array comprised droplets of a non-volatile oily liquid colored with dyes and pigment particles, dispersed in an aqueous phase using colloidal silica as a surface-stabilizing and size-controlling substance, and then coated with gelatin as a binder and dried.

Two silica dispersions were prepared:

Silica dispersion A:

To 320 g of water was added 12 g of Ludox(Trademark) SM30 colloidal silica suspension and 1.2 g of a 10% w/v aqueous solution of a copolymer of methylaminoethanol and adipic acid. The mixture was stirred and its pH adjusted from its initial value of 4.86 to 4.00 by addition of 4M sulphuric acid.

Silica dispersion B:

To 312 g of water was added 20 g of Ludox(Trademark) AM30 colloidal silica suspension and 1.0 g of a 10% w/v aqueous solution of a copolymer of methylaminoethanol and adipic acid. The mixture was stirred and its pH adjusted from its initial value of 4.48 to 4.00 by addition of 4M sulphuric acid.

Dispersions of colored oil droplets were prepared:

Red dispersion.

The following were mixed together to form a colored oil phase:

| | |
|---|---|
| Sudan M Red 462 Liquid Dye (supplied by BASF) | 3.5 g |
| Sudan Yellow 172 Liquid Dye (supplied by BASF) | 2.7 |
| Tricresyl phosphate | 8.0 |
| di-n-butyl lauramide | 8.0 |

To this was added the following aqueous phase:

| | |
|---|---|
| Silica dispersion A | 24 g |
| Silica dispersion B | 12 g |
| Water | 64 |

and the combined mixture was agitated for 5 minutes with a "Soniprobe"

ultrasonic probe (supplied by Lucas Dawe Ultrasonics) to form an oil-in-water dispersion. The probe used had a tip diameter of half an inch (1.3 cm), and the power setting employed was 5 or 50%.

The dispersion was then added to 120 g of 12.5% w/v aqueous gelatin solution containing 0.17% w/v Alkanol XC surfactant.

Blue oil phase:

The following mixture was ball-milled for 3 days using 1 mm diameter zirconia beads as the grinding media:

| | |
|---|---|
| CI Pigment Violet 23 | 6.0 g |
| CI Solvent Blue 14 | 3.2 |
| CI Solvent Blue 35 | 1.6 |
| Tricresyl phosphate | 30 |
| di-n-butyl lauramide | 30 |

Blue dispersion:

To 20 g of the blue oil phase was added the following aqueous phase:

| | |
|---|---|
| Silica dispersion A | 22.5 g |
| Silica dispersion B | 10.0 |
| Water | 92.5 |

and the combined mixture was agitated for 5 minutes with a "Soniprobe" ultrasonic probe (supplied by Lucas Dawe Ultrasonics) to form an oil-in-water dispersion. The probe used had a tip diameter of half an inch (1.3 cm), and the power setting employed was 5 or 50%.

The dispersion was then added to 150 g of 12.5% w/v aqueous gelatin solution containing 0.17% w/v Alkanol XC surfactant.

Green oil phase:

The following mixture was ball-milled for 3 days using 1 mm diameter zirconia beads as the grinding media:

| | |
|---|---|
| CI Pigment Green 7 | 9.0 g |
| CI Pigment Yellow 92 | 6.0 |
| tricresyl phosphate | 30.0 |
| di-n-butyl lauramide | 30.0 |
| ethanol | 30.0 |

Green dispersion:

To 28 g of the green oil phase was added the following aqueous phase:

| | |
|---|---|
| Silica dispersion A | 30.0 g |
| Silica dispersion B | 15.0 |
| Water | 72.5 |

and the combined mixture was agitated for 5 minutes with a "Soniprobe" ultrasonic probe (supplied by Lucas Dawe Ultrasonics) to form an oil-in-water dispersion. The probe used had a tip diameter of half an inch (1.3 cm) and the power setting employed was 5 or 50%.

The dispersion was then added to 150 g of 12.5% w/v aqueous gelatin solution containing 0.17% w/v Alkanol XC surfactant.

Coating of color filter array:

Portions of the above dispersions were mixed together:

| | |
|---|---|
| Red dispersion | 82 g |
| Green dispersion | 123 |
| Blue dispersion | 95 |
| Water | 48 |

and the resulting mixture was coated on photographic film base at a wet coverage of 35 ml per square meter. At the same time, aqueous gelatin layers were coated above and below the filter array layer, to give the following coated laydowns:

Layer 1: gelatin, 1.0 g/m2

Layer 2: gelatin, 2.2 g/m2, red oil phase, 0.70 g/m2, green oil phase, 0.75 g/m2, blue oil phase, 0.60 g/m2

Layer 3: gelatin, 0.72 g/m2.

On examining the coated layer under a microscope, it was seen that it had dried to give an array of closely packed red, green and blue color elements, approximately circular in shape and having diameters between 5 and 10 micrometers. They were in a single layer, with little overlap between adjacent elements, and about 12% of the total area comprised colorless areas between the colored elements.

Coating of light sensitive layers:

A length of the coated color filter array was then coated with photographic emulsion layers so that the emulsion layers were immediately above the layers of the array.

Emulsion layer A:

Fast silver bromoiodide panchromatically sensitized emulsion (tabular grain, average diameter approx. 1.7 $\mu$m, thickness 0.13 $\mu$m, 4.5 mol % iodide), coated at 0.7 g/m2, together with gelatin, 1.3 g/m2. 4-hydroxy-6-methyl-1,3,3A,7-tetraazindene, sodium salt, was also present at 1.5 g per mole of silver.

Emulsion layer B (layer 5):

Mid speed silver bromoiodide panchromatically sensitized emulsion (tabular grain, average diameter approx. 1.1 $\mu$m, thickness 0.12 $\mu$m, 4.55 mol % iodide), coated at 1.5 g/m2, slow silver bromoiodide panchromatically sensitized emulsion (tabular grain, average diameter approx. 0.7 $\mu$m, thickness 0.11 $\mu$m, 3 mol % iodide), coated at 1.0 g/m2 together with gelatin, 2.0 g/m2. 4-hydroxy-6-methyl-1,3,3A,7-tetraazindene, sodium salt, was also present at 1.5 g per mole of silver.

Supercoat (layer 6):

Gelatin, 1.6 g/m2, hardener bis(vinylsulphonyl)methane, 0.072 g/m2, and an antihalation dye whose color was dischargeable in the developer solution, coated a:; a particulate dispersion, 0.1 g/m2.

Surfactants used to aid the coating operation are not listed in this example.

Recording a scene with the film:

A length of the film was slit to 35 mm width, the edges were perforated, the film was put in a standard 35 mm cassette, and the cassette loaded into a single lens reflex camera. The film was oriented so that light from the camera lens passed first through the film base, then through the coated color filter array, and then onto the emulsion layers.

The camera was adjusted to give an exposure at a speed setting of 200 ISO, and a photograph taken of an outdoor scene.

The exposed film was developed for 2 minutes at 25 C. in the following developer solution:

| | |
|---|---|
| sodium carbonate (anh.) | 9 g/l |
| ascorbic acid | 7.5 |
| sodium sulphite (anh.) | 2.5 |
| sodium bromide | 0.5 |
| 4-hydroxymethyl-4-methyl-1-phenyl-3-pyrazolidone | 0.35 |

pH adjusted to 10.0 with dilute sodium hydroxide solution.

It was treated for 15 s with a stop bath (1% acetic acid aqueous solution) and fixed for 1 minute in Kodak "3000" Fixer Solution diluted 1+3 with water, then washed for 3 minutes and dried. A colored negative image of the scene was visible.

The image was then scanned with a Kodak RFS 2035 scanner and the resulting image file imported into Adobe Photoshop™ image manipulation software. The "Autolevels" command was used to correct overall brightness, contrast and color balance, then the image was converted to L*a*b* color space. The a and b channels were treated with a blurring filter (Gaussian blur, 12 pixels radius) then their contrast increased using a numerical value of 75, which resulted in a strong increase in color saturation. The image was converted back to R,G,B space and color saturation and color balance adjusted to give a pleasing colored image of the original scene.

EXAMPLE 2

This Example describes the change in dimensions of the colored droplets of the filter array on wetting and drying.

A piece of the processed film described in Example 1 was examined under the microscope, and a photomicrograph taken at 200×magnification. It was then soaked with a drop of water, the excess blotted off, and the sample again examined and another micrograph taken. It was observed, by measurement of the micrograph image with a magnifying glass equipped with a graticule, that the colored droplets in the wet film had diminished to approximately two thirds their diameter in the dry condition, from an average of about 6 microns to 4 microns, and that the white or colorless space between the droplets had greatly increased.

The sample was then allowed to dry, and the colored droplets were observed to have increased in diameter, and the white or colorless space between the droplets decreased, so that the filter array had resumed the appearance it had before wetting.

EXAMPLE 3

This Example describes the preparation of a film according to the invention and its use with rapid access photographic processing. The film had the preferred structure in which the CFA layer is coated further from the film support than the emulsion layers.

Preparation of Photographic Light-sensitive Layers

Photographic film base was coated, by means of an experimental slide-hopper coating machine, with the following layers:

Layer 1: aqueous gelatin solution and a particulate dispersion of an antihalation dye whose color was dischargeable in the developer solution, were coated to give coated laydowns of 1.2 and 0.1 g/m2 respectively.

Layers 2 and 3 comprised photographic silver bromoiodide tabular grain emulsions of varying grain size, and a dispersion of the incorporated developing agent DA, N,N'-(4-hydroxy-1,3-phenylene)bis(4-(dodecyloxy) benzenesulphonamide), which was present as a conventional photogaphic dispersion, being dispersed in the presence of an equal weight of the coupler solvent tricresyl phosphate. The emulsions were all sensitized with sulphur and gold, and with red sensitizing dyes which gave spectral sensitivity across the visible spectrum. The following laydowns were coated, the emulsion laydowns being quoted as grams per square meter of silver, not silver halide:

Layer 2:

Gelatin, 3.2 g/m2

Developing agent DA, 1.25 g/m2

Medium-fast emulsion, 1.3μ equivalent diameter, 0.12μ thickness, 0.8 g/m2

Medium-slow emulsion, 0.66μ equivalent diameter, 0.12μ thickness, 1.2 g/m2

Slow emulsion, 0.55μ equivalent diameter, 0.08μ thickness, 1.2 g/m2

4-hydroxy-6-methyl-1,3,3A,7-tetraazindene, sodium salt, was also present at 1.5 g per mole of silver.

Layer 3:

Gelatin, 1.4 g/m2

Developing agent DA, 0.45 g/m2

Fast emulsion, 2.6μ equivalent diameter, 0.12μ thickness, 1.4 g/m2

4-hydroxy-6-methyl-1,3,3A,7-tetraazindene, sodium salt, was also present at 1.5 g per mole of silver.

Layer 4:

Gelatin, 0.6 g/m2

Hardener bis(vinylsulphonyl)methane, 0.08 g/m2

Preparation of Color Filter Array Layer.

The color filter array comprised a coating of dispersions of red droplets and green droplets in a larger size class, and a mixture of finely milled cyan and magenta pigment particles in the smaller size class. A suspension of the combined dispersions in dilute gelatin solution was coated on top of the photographic light sensitive layers.

Red Dispersion:

Pigments were dispersed in an oil phase. The following were placed in a glass jar together with about 100 ml of 1 mm diameter zirconia beads, and the jar was rotated on a roller mill for three days:

| | |
|---|---|
| Irgazine red A2BN* | 15 g |
| Cromophtal Yellow 3RT* | 6 |
| Solsperse 17000** | 1.5 |
| - dissolved in tricresyl phosphate | 50 |
| Solsperse 22000** | 0.38 |
| Tricresyl phosphate | 10 |
| N,N-di-n-butyl lauramide | 60 |
| Ethyl acetate | 37.5 |

*pigments supplied by CIBA Specialty Chemicals plc
**dispersing agents supplied by Avecia (Pigments and Additives)

The resulting oil dispersion was then dispersed in an aqueous phase as follows:

To 30 g of the red oil dispersion was added

| | |
|---|---|
| Silica dispersion* | 50 g |
| Water | 70 |

*the silica dispersion was prepared as follows:

To 318 g of water was added 12 g of Ludox (trademark) SM30 colloidal silica suspension and 3.6 g of a 10% w/v aqueous solution of a copolymer of methylaminoethanol and adipic acid. The mixture was stirred and its pH adjusted from its initial value of 4.86 to 4.00 by addition of 4M sulphuric acid.

and the combined mixture was agitated for 5 minutes with a "Soniprobe" ultrasonic probe (supplied by Lucas Dawe Ultrasonics) to form an oil-in-water dispersion. The probe used had a tip diameter of half an inch, (1.3 cm) and the power setting employed was 6.5 or 65%.

The resulting dispersion was then added to

| | |
|---|---|
| Gelatin solution in water, 12.5 wt % | 35 g |
| Water | 80 |
| Poly(styrene-alt-maleic acid), sodium salt, 5 wt % solution in water | 30 |
| sodium dodecyl sulphate, 10 wt % solution in water | 5 |

When coated on a glass slide and allowed to dry, microscopic examination showed approximately circular red elements of approximately 7 microns average diameter.

Green dispersion:

Pigments were dispersed in an oil phase. The following were placed in a glass jar together with about 100 ml of 1 mm diameter zirconia beads, and the jar was rotated on a roller mill for three days:

| | |
|---|---|
| Irgalite Green GFNP* | 8 g |
| Cromophtal Yellow 3G* | 7 |
| Solsperse 5000** | 0.5 |
| Solsperse 24000** | 3 |
| Tricresyl phosphate | 32 |
| N,N-di-n-butyl lauramide | 32 |
| Ethyl acetate | 20.5 |

*pigments supplied by CIBA Specialty Chemicals plc
**dispersing agents supplied by Avecia (Pigments and Additives)

The resulting oil dispersion was then dispersed in an aqueous phase as follows:

To 22 g of the green oil dispersion was added

| | |
|---|---|
| Silica dispersion* | 30 g |
| Water | 50 |

*as described above and the combined mixture was agitated for 4 minutes with a "Soniprobe" ultrasonic probe (supplied by Lucas Dawe Ultrasonics) to form an oil-in-water dispersion. The probe used had a tip diameter of half an inch (1.3 cm), and the power setting employed was 6.5 or 65%.

The resulting dispersion was then added to

| | |
|---|---|
| Gelatin solution in water, 12.5 wt % | 33.3 g |
| Water | 43.3 |
| Poly(styrene-alt-maleic acid), sodium salt, 5 wt % solution in water | 20 |
| sodium dodecyl sulphate, 10 wt % solution in water | 3.3 |

When coated on a glass slide and allowed to dry, microscopic examination showed approximately circular green elements of approximately 6 microns average diameter.

Magenta Aqueous Dispersion

The following mixture was put in a glass jar together with about 30 ml of 1 mm diameter zirconia beads and ball-milled for three days:

| | |
|---|---|
| Cromophtal Violet GT* | 5.0 g |
| Polyvinyl pyrrolidone, m.wt 40,000 | 0.5 |
| Water | 44.5 |

*pigment supplied by CIBA Specialty Chemicals plc

Microscopic examination of a sample coated on a glass slide with a little gelatin showed the particle size of the pigment to be of the order of 0.2 microns and less.

Cyan Aqueous Dispersion

The dispersion, which comprised 10 wt % of bridged aluminum phthalocyanine (bis(phthalocyanylalumino) tetraphenyldisiloxane), obtained from the Synthetic Chemicals Division of Eastman Kodak Co., was prepared according to the procedure of Example 13 of U.S. Pat. No. 5,738,716. The particle size of the dispersion was less than 0.1 microns.

Coating of the Color Filter Array:

Portions of the red oil dispersion, the green oil dispersion, and the two aqueous pigment dispersions were mixed together with water and gelatin at a temperature of 40 C. and coated with an experimental slide-hopper coating machine on top of the emulsion coating described above. The gelatin concentration in the coating melt was 1.5 wt %, and the melt was applied to the emulsion coating at a wet coverage of 40 ml per square meter, to give the following coated laydowns:

| | |
|---|---|
| Red oil dispersion* | 1.5 g/m2 |
| Green oil dispersion* | 1.15 |
| Cyan pigment | 0.10 |
| Violet pigment | 0.15 |
| Gelatin | 0.6 |

*the cited laydowns refer to the sum of pigments, stabilizers and the two solvents tricresyl phosphate and N,N-di-n-butyl lauramide, and exclude the ethyl acetate.

A further protective layer was simultaneously coated above the color filter array layer, this layer comprised gelatin (7.5 wt % solution in water) and the hardener bis (vinylsulphonyl)methane, to give coated laydowns of 1.5 g/m2 and 0.084 g/m2 respectively.

Microscopic examination of a portion of the coating, after treatment with photographic fixer solution, showed the color filter array to comprise randomly ordered approximately circular red and green elements of approximate diameter 7 and 6 microns respectively, surrounded by an essentially uniform blue colored "sea".

Formation of Image

The coating was slit to 35 mm width and a length of it was exposed to light from a sensitometer which had passed through a colored Ektachrome test transparency which was held in close emulsion-to-emulsion contact with the film sample. The film was then developed for 20 seconds at 50 C. in the following developer solution, which had been adjusted to a pH of 10.5:

| | |
|---|---|
| Sodium carbonate (anh.) | 25 g/l |
| sodium sulphite (anh.) | 75 |
| glycine | 25 |
| sodium bromide | 0.33 |
| 4-hydroxymethyl-4-methyl-1-phenyl-3-pyrazolidone | 1.5 |
| 6-nitrobenzimidazole | 0.02 |

pH adjusted to 10.5 with dilute sodium hydroxide solution.

It was then fixed for 10 seconds at 50 C. in Kodak "C41-RA" Fixer Solution diluted 1+1 with water, then washed in water at 50 C. for 10 seconds and dried. A colored negative image of the test transparency was visible.

The image was then scanned with a Kodak DLS scanner and the resulting image file imported into Adobe Photoshop™ image manipulation software. The "Autolevels" command was used to correct overall brightness, contrast and color balance, then the image was converted to L*a*b* color space. The a and b channels were treated with a blurring filter (Gaussian blur, 12 pixels radius) then their contrast increased using a numerical value of 80, which resulted in a strong increase in color saturation. The image was converted back to R,G,B space and color saturation and color balance adjusted to give a colored image of the scene on the test transparency.

As stated earlier, the film of the invention has the advantage of exceptionally rapid and convenient photographic processing, as it can be processed using simple negative back-and-white development, as opposed to either a reversal process or a chromogenic process. It avoids the disadvantages of aliasing and of high manufacturing cost associated with regular color filter arrays by using a random array which may be prepared simply by coating a layer of suitable colored particles or droplets. The lower image quality formerly associated with random color filter arrays is overcome by means of electronic image processing, which can result in good quality color images, especially in the case of the preferred embodiment having the specified filter element sizes.

The invention has been described with particular reference to several examples. It will be understood by those skilled in the art that variations and modifications may be effected within the spirit and scope of the invention as defined in the appended claims.

PARTS LIST 1. filter layer
2. color filter elements
3. binder
4. channels
5. support
6. anti-halation layer
7. emulsion layer unit
8. supercoat

What is claimed is:

1. A color film comprising a support layer, at least one light sensitive emulsion layer and a layer formed of a randomly disposed color filter array, wherein the color filter array is coated from an aqueous medium and comprises droplets of water immiscible oily liquid having pigments dispersed therein which are fluid at the temperatures used in coating and drying.

2. A film as claimed in claim 1 wherein the water immiscible oily liquid also has polymeric substances dissolved therein.

3. A film as claimed in claim 2 wherein the water immiscible oily liquid also has particulate dispersing agents dispersed therein.

4. A film as claimed in claim 1 wherein the water immiscible oily liquid also has particulate dispersing agents dispersed therein.

5. A film as claimed in claim 1 wherein the filter elements have linear dimensions in the plane of the film of between 1 and 50 micrometres.

6. A film as claimed in claim 5 wherein the filter elements have linear dimensions of between 3 and 10 micrometres.

7. A film as claimed in claim 1 wherein the color filter array layer is coated further from the support layer than the at least one emulsion layer.

8. A method of forming a color image of a scene from an imagewise exposed photographic film, the film comprising a color film comprising a support layer, at least one light sensitive emulsion layer and a layer formed of a randomly disposed color filter array, wherein the color filter array is coated from an aqueous medium and comprises droplets of water immiscible oily liquid having pigments dispersed therein which are fluid at the temperatures used in coating and drying, the method comprising developing the image of the scene formed in the emulsion layer, and processing scanned image information to give an electronically coded representation of the scene.

* * * * *